United States Patent
Hoernke et al.

(10) Patent No.: US 10,967,765 B2
(45) Date of Patent: Apr. 6, 2021

(54) SUPPORT FOR VEHICLE SEATING ASSEMBLY

(71) Applicant: Ford Global Technologies, LLC, Dearborn, MI (US)

(72) Inventors: Spencer Robert Hoernke, Dundas (CA); Johnathan Andrew Line, Northville, MI (US); Scott Holmes Dunham, Redford, MI (US); Jimmy Moua, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 16/267,600

(22) Filed: Feb. 5, 2019

(65) Prior Publication Data
US 2020/0247356 A1    Aug. 6, 2020

(51) Int. Cl.
*B60N 2/42*      (2006.01)
*B60R 22/40*     (2006.01)
*B60R 22/26*     (2006.01)
*B60R 22/34*     (2006.01)
*B60R 22/343*    (2006.01)

(52) U.S. Cl.
CPC ............ *B60N 2/4228* (2013.01); *B60R 22/26* (2013.01); *B60R 22/343* (2013.01); *B60R 22/3416* (2013.01); *B60R 22/40* (2013.01); *B60R 2022/3421* (2013.01)

(58) Field of Classification Search
CPC .. B60N 2/4228; B60N 2/4221; B60N 2/4214; B60N 2/42
See application file for complete search history.

(56) References Cited

U.S. PATENT DOCUMENTS

| | | | |
|---|---|---|---|
| 5,769,489 A | 6/1998 | Dellanno | |
| 6,004,084 A * | 12/1999 | Moker | B60N 2/4279 410/118 |
| 6,084,314 A | 7/2000 | McCurdy | |
| 7,070,236 B2 | 7/2006 | Kawashima | |
| 7,866,703 B2 | 1/2011 | Spahn et al. | |
| 7,905,547 B2 * | 3/2011 | Lawall | B60N 2/42745 297/284.4 |
| 9,821,758 B2 | 11/2017 | Jaradi et al. | |
| 9,889,771 B2 * | 2/2018 | Ohno | B60R 21/207 |
| 2012/0112513 A1 * | 5/2012 | Mitsuoka | B60N 2/22 297/452.18 |
| 2018/0079341 A1 * | 3/2018 | Nishimura | B60R 22/195 |
| 2019/0193610 A1 * | 6/2019 | Ketels | B60N 2/42763 |
| 2020/0238869 A1 * | 7/2020 | Line | B60N 2/6671 |

FOREIGN PATENT DOCUMENTS

DE    19927403 A1    1/2001

\* cited by examiner

*Primary Examiner* — David R Dunn
*Assistant Examiner* — Tania Abraham
(74) *Attorney, Agent, or Firm* — David Coppiellie; Price Heneveld LLP (57) ABSTRACT

A vehicle seating assembly includes a seatback with a frame assembly having first and second portions. A primary structure extends between the first and second portions and defines a seating surface. A secondary structure extends between the first and second portions. A retractor mechanism is disposed on one of the first and second portions and is selectively positionable in an unlocked, a locked, or a pre-tensioned position.

15 Claims, 9 Drawing Sheets

SUPPORT FOR VEHICLE SEATING ASSEMBLY

FIELD OF THE DISCLOSURE

The present disclosure generally relates to a support for a vehicle seating assembly.

BACKGROUND OF THE DISCLOSURE

Vehicle seating assembly safety during automotive collisions has become increasingly important. Providing seating assembly designs that support seating surfaces during collisions can increase the safety of passengers.

SUMMARY OF THE DISCLOSURE

According to a first aspect of the present disclosure, a vehicle seating assembly includes a seatback with a frame assembly having first and second portions. A primary structure extends between the first and second portions and defines a seating surface. A secondary structure extends between the first and second portions. A retractor mechanism is disposed on one of the first and second portions and is selectively positionable in an unlocked, a locked, or a pre-tensioned position.

Embodiments of the first aspect of the disclosure can include any one or a combination of the following features:
- the secondary structure includes a belt including a first end coupled to one of the first and second portions and a second end coupled to the retractor mechanism disposed on a respective opposing first or second portion;
- the first portion includes a first longitudinal portion and wherein the second portion includes a second longitudinal portion;
- the secondary structure includes a mat having a first edge aligned with the first longitudinal portion and a second edge aligned with the second longitudinal portion;
- the mat includes a third edge and wherein the belt is attached to the third edge of the mat;
- when the retractor mechanism is in an unlocked position, the belt is in a spooling position;
- when the retractor mechanism is in a locked position, the belt is in a fixed position;
- when the retractor mechanism is in a pre-tensioned position, the belt is in a retracted position;
- when the belt is in a retracted position, the belt includes a predetermined exposed length;
- the secondary structure includes a mesh mat;
- a cover assembly disposed around the frame; and
- the cover assembly comprises a first cover part and a second cover part.

According to a second aspect of the present disclosure, a vehicle seating assembly includes a seatback with a primary structure, a secondary structure, a frame assembly, a selectively positionable retractor mechanism coupled to the frame assembly and the secondary structure, and a controller in communication with the selectively positionable retractor mechanism and configured to receive an input and to activate a pre-tensioner disposed in the retractor mechanism to retract the secondary structure in response to the input.

Embodiments of the second aspect of the disclosure can include any one or a combination of the following features:
- the controller selectively activates the pre-tensioner in response to a deceleration signal; and
- the controller is disposed in an airbag circuit and wherein the controller selectively activates the pre-tensioner in response to an airbag activation signal.

According to a third aspect of the present disclosure, a vehicle seating assembly includes a seatback with a frame assembly including first and second portions. A primary structure defines a seating surface coupled to the frame assembly. A secondary structure is coupled to the frame assembly. A belt extends between the first and second portions and is coupled to the secondary structure. A retractor mechanism is disposed on one of the first and second portions of the frame assembly and receives an end of the belt. The retractor mechanism is selectively activated to adjust a position of the belt and the secondary structure.

Embodiments of the third aspect of the disclosure can include any one or a combination of the following features:
- the belt is selectively positionable in at least one of a spooling position, a fixed position, and a retracted position;
- the primary structure comprises a see-through material;
- the secondary structure comprises a see-through material; and
- the secondary structure is fastened to a second cross member of the frame assembly.

These and other aspects, objects, and features of the present disclosure will be understood and appreciated by those skilled in the art upon studying the following specification, claims, and appended drawings.

DETAILED DESCRIPTION

Figure 1:
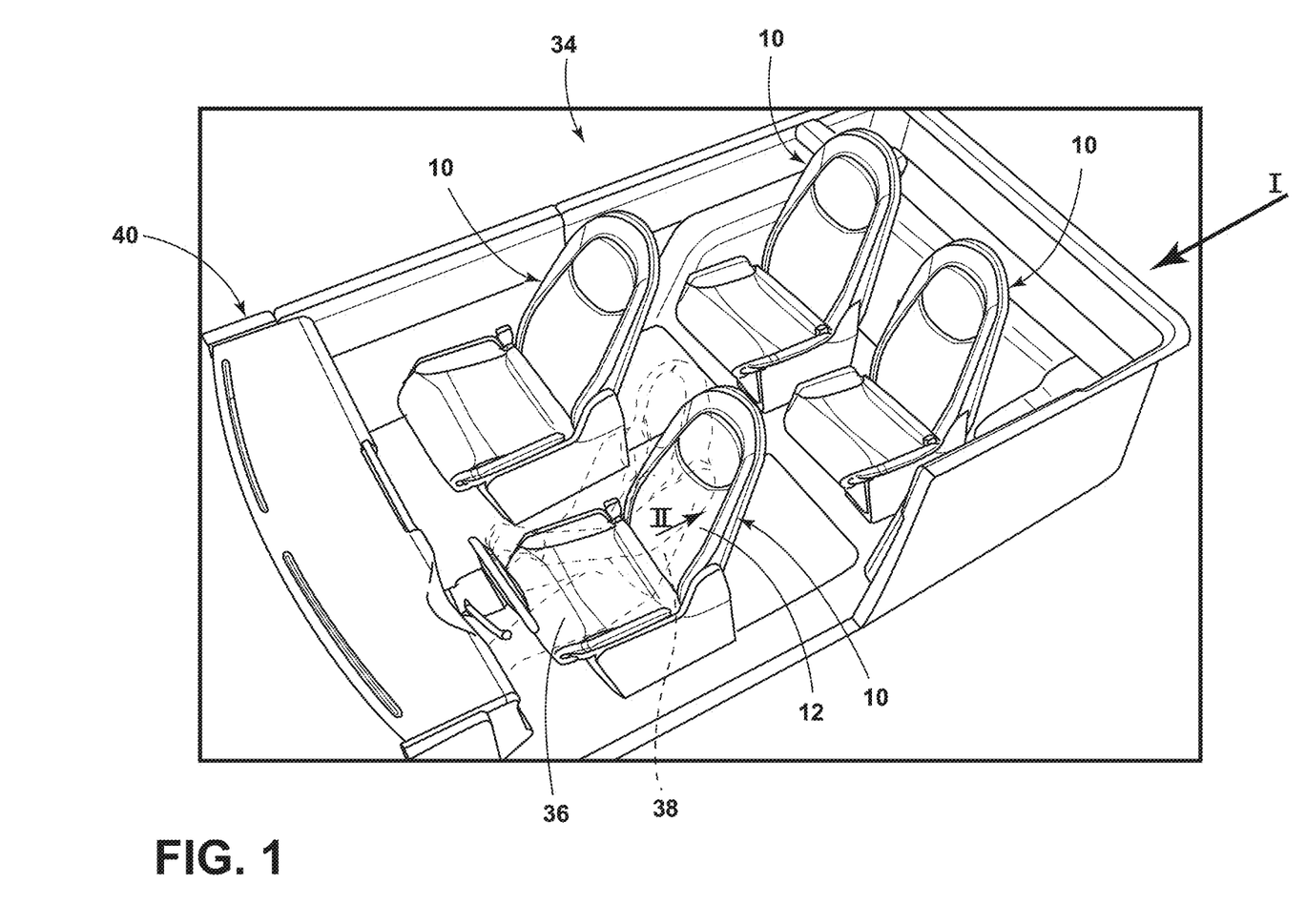
FIG. 1 is a perspective view of a vehicle interior, according to an embodiment.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIGS. 1-12, a vehicle seating assembly 10 includes a seatback 12. The seatback 12 includes a frame assembly 14, a primary structure 16, a secondary structure 18, and a retractor mechanism 20. The frame assembly 14 includes first and second portions 22, 24. The primary structure 16 extends between the first and second portions 22, 24 and defines a seating surface 26. The secondary structure 18 extends between the first and second portions 22, 24. A retractor mechanism 20 is disposed on one of the first and second portions 22, 24. The retractor mechanism 20 is selectively positionable in an unlocked position A, a locked position B, or a pre-tensioned position C.

Referring to FIG. 1, seating assemblies 10 disposed in a vehicle interior 34 are shown. A seating assembly 10 may include a seatback 12 and a seat 36. An occupant 38 is shown seated in a seating assembly 10. The seating assembly 10 may be described with reference to an occupant 38 seated in the seating assembly 10. The parts of the seating assembly 10 to the right of a seated occupant 38 may be referred to as "first." The parts of the seating assembly 10 to the left of a seated occupant 38 may be referred to as "second." Arrow I may represent a dynamic impact to the rear of the vehicle 40. The dynamic impact to the rear of the vehicle 40 may cause an occupant 38 to move in the direction depicted by arrow II into the seatback 12. It is therefore advisable that the seatback 12 include a support that restrains an occupant 38 from moving into the seatback 12 during a rear collision represented by arrow I.

In conventional seating assemblies, energy management during a vehicle collision (for example, a rear dynamic impact represented by arrow I in FIG. 1) may be achieved in a variety of ways. For example, conventional seating assemblies may include cushions made of energy absorbing materials such as polyurethane foam and/or Expanded Polypropylene (EPP) foam. Cushions made of exemplary energy absorbing materials such as polyurethane foam and/or Expanded Polypropylene (EPP) foam may be used in a conventional seating assembly in combination with a steel frame, a lumbar basket, or a hard plastic seatback to create a reaction surface for the seated occupant during a vehicle collision (for example, a rear dynamic impact represented by arrow I in FIG. 1). The reaction surface may absorb the energy of the occupant during a vehicle collision such as a rear dynamic impact represented by arrow I in FIG. 1.

Seating assemblies of various designs may require various energy absorbing features. Thin seatbacks may include less space for energy absorbing cushions than conventional seatbacks. Also, some seatbacks may have seatback surfaces (for example, see-through seating surfaces or sling-type seating surfaces) that may minimize or may avoid use of conventional vehicle seating support and energy absorption features such as cushions.

Thus, vehicle seating assemblies that may have a thin seatback and/or a seatback surface with minimal occupant support may include a supplementary occupant support structure. The supplementary occupant support structure may support the occupant and the seatback seating surface during a vehicle collision (for example, a rear dynamic impact depicted by arrow I in FIG. 1). The supplementary occupant support structure may include a belt coupled to a retractor mechanism. The belt and the retractor mechanism may be mounted to a seatback frame assembly. The retractor mechanism may be selectively positioned to fix the supplementary occupant support structure in one or more predetermined positions during a vehicle collision. The retractor mechanism may be selectively positioned to allow the belt to spool and the supplementary occupant supporting structure to move during standard (i.e., non-collision) driving conditions.

Figures 2, 2A:
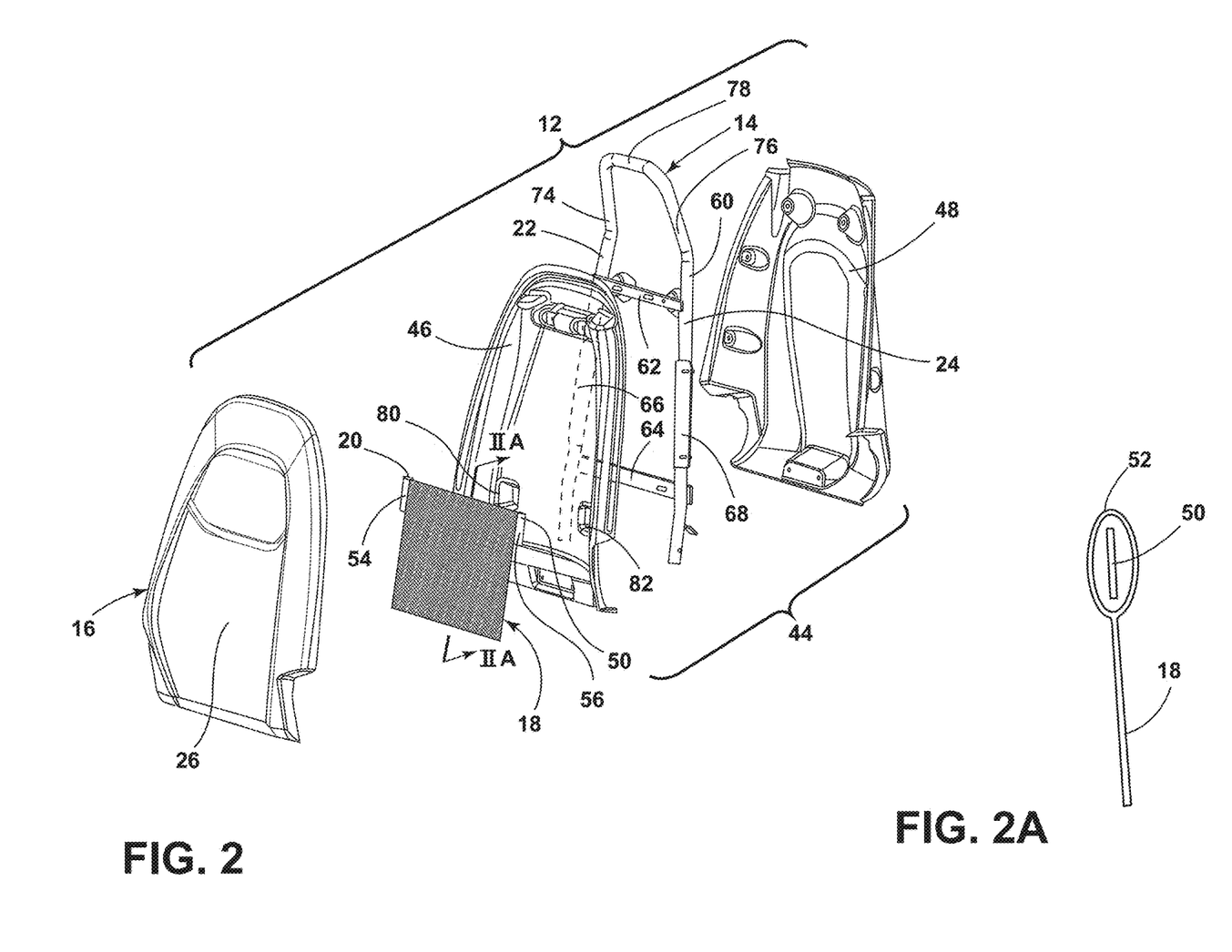
FIG. 2 is an exploded view of a seatback, according to an embodiment.
FIG. 2A is a cross-sectional view of a secondary support taken along line IIA-IIA of FIG. 2.

Referring to FIG. 2, an exploded view of the seatback 12 is shown. The seatback 12 may include a primary structure 16, a secondary structure 18, a cover assembly 44, and a frame assembly 14. The secondary structure 18 may be referred to as the supplementary occupant support structure. The cover assembly 44 may include a first cover part 46 and a second cover part 48. When the cover assembly 44 is assembled, the first cover part 46 and the second cover part 48 may enclose the frame assembly 14. With reference to the primary structure 16, the primary structure 16 may include the seatback seating surface 26. The primary structure 16 may include a mesh material or a similar deformable material. The secondary structure 18 may include a mat. The mat may be a mesh material. The primary structure 16 and the secondary structure 18 may also include a see-through material. The mesh material may be a see-though material. A belt 50 may be disposed at the top of the secondary structure 18. The secondary structure 18 may include a loop 52 for receiving the belt 50 (FIG. 2A). In various examples, the belt 50 may be fastened to the secondary structure 18. In various examples, the belt 50 may slide within the loop 52. The belt 50 may include a first end 54 and a second end 56. The first end 54 of the belt 50 may be disposed in the retractor mechanism 20. The belt 50 may be attached to a spool 58 of the retractor mechanism 20 (FIGS. 10, 11A-11C). The exposed length of the belt 50 may be varied when the belt 50 is rolled around the spool 58 or released from the spool 58 (FIGS. 10, 11A-11C).

With continuing reference to FIG. 2, the frame assembly 14 may support the primary structure 16 and the secondary structure 18. The frame assembly 14 may include a frame 60, a first cross member 62, a second cross member 64, a first mounting plate 66, and a second mounting plate 68. The frame assembly 14 may include a first portion 22 and a second portion 24. The first portion 22 may include a first longitudinal portion. The second portion 24 may include a second longitudinal portion. The frame 60 may include a first side 74 disposed at a right side of seated occupant 38. The frame 60 may include a second side 76 disposed at a left side of a seated occupant 38. The frame 60 may include a third side 78 disposed at the top of the frame 60. The first cross member 62 may be referred to as the upper cross member. The second cross member 64 may be referred to as the lower cross member.

With continued reference to FIG. 2, the first and second mounting plates 66, 68 may be used for mounting the retractor mechanism 20 to the frame assembly 14 and for mounting the second end 56 of the belt 50 to the frame assembly 14, respectively. The first mounting plate 66 may be disposed on the first side 74 of the frame 60. The second mounting plate 68 may be disposed on the second side 76 of the frame 60.

With continued reference to FIG. 2, the first cover part 46 and the second cover part 48 may be fastened around the frame assembly 14. The first cover part 46 may include a first slot 80 and a second slot 82. The first slot 80 may receive a retractor mechanism 20 disposed at a first end 54 of the belt 50. The second slot 82 may receive the second end 56 of the belt 50.

Figure 3:
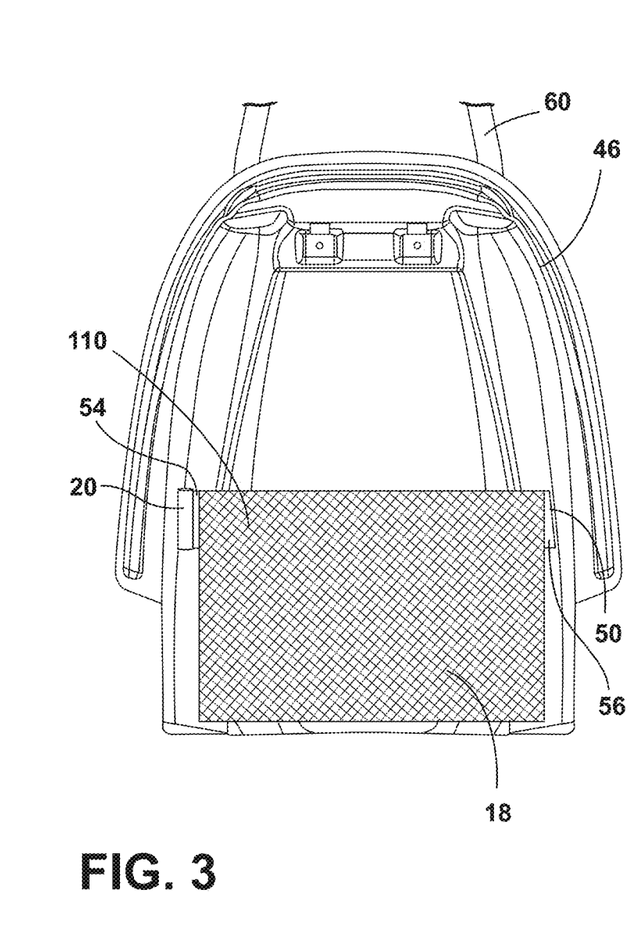
FIG. 3 is a partial front elevational view of a secondary support coupled to a first cover part, according to an embodiment.
Figure 4:
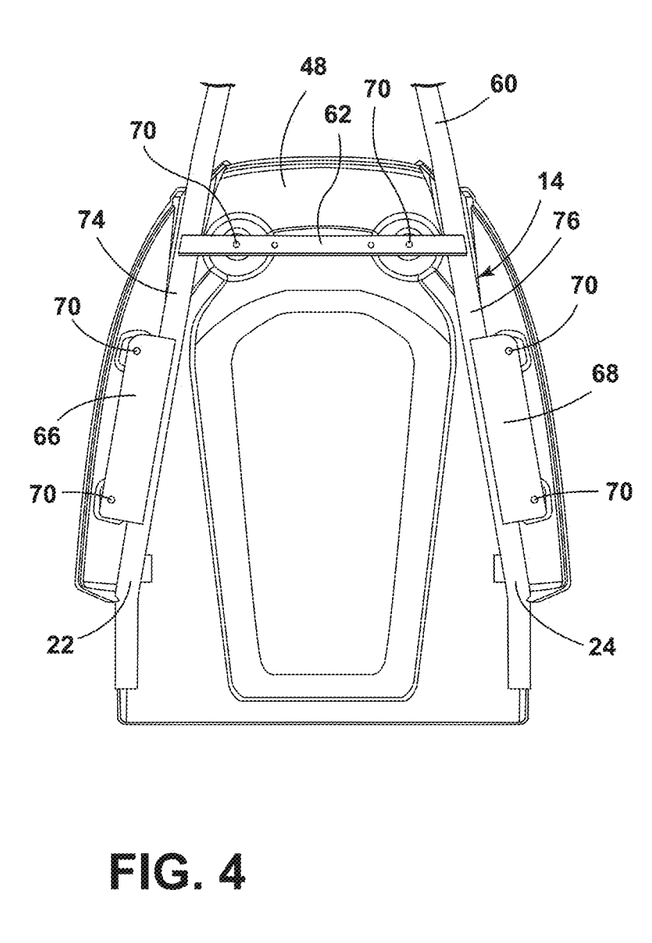
FIG. 4 is a partial front elevational view of a frame assembly coupled to a second cover part, according to an embodiment.

Referring to FIGS. 3-4, at least part of the retractor mechanism 20 may be attached to the first side 74 of the frame 60. At least part of the second end 56 of the belt 50 may be attached to the second side 76 of the frame 60. At least part of the retractor mechanism 20 may also be attached to the first mounting plate 66. At least part of the second end 56 of the belt 50 may also be attached to the second mounting plate 68.

Referring to FIG. 3, a partial front elevational view is shown of the secondary structure 18, the first cover part 46, and the frame 60. A belt 50 may be disposed at a third edge 110 of the secondary structure 18.

Referring to FIG. 4, a partial front elevational view is shown of the frame assembly 14 and the second cover part 48. Fasteners 70 may extend from the first and second mounting plates 66, 68 into the second cover part 48. Fasteners 70 may extend from the first cross member 62 into the second cover part 48. The fasteners 70 may attach the frame assembly 14 to the second cover part 48.

Figure 5:
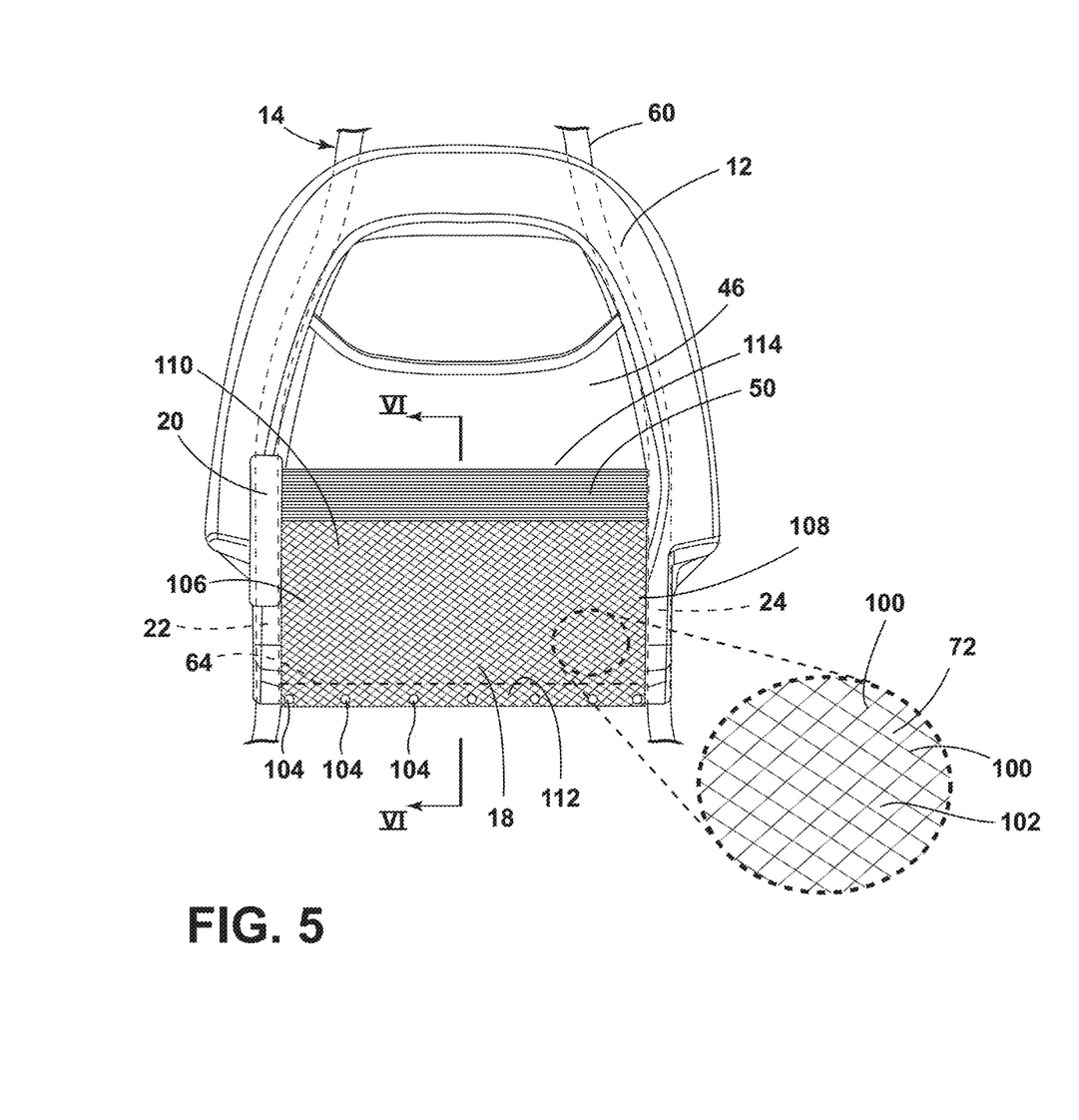
FIG. 5 is a partial front elevational view of a secondary support fastened to a first cover part and a frame assembly, according to an embodiment.

FIG. 5 shows various features that enable the secondary structure 18 to act as a support for the primary structure 16 during operation of the vehicle 40 and use of the seatback 12 by an occupant 38. In the embodiment shown, the secondary structure 18 may include a mesh material 72. The mesh material 72 may include openings 102 in the fabric 100. The secondary structure 18 may include a first edge 106, a second edge 108, a third edge 110, and a fourth edge 112. Fasteners 104 may extend through the secondary structure 18 along the fourth edge 112 to secure the secondary structure 18 to the second cross member 64. Fasteners 104 may extend into the second cross member 64. In various embodiments, the first and second edges 106, 108 of the secondary structure 18 may be attached to the frame assembly 14. In various embodiments, the first and second edges 106, 108 of the secondary structure 18 may be attached to the primary structure 16. In various embodiments, the first and second edges 106, 108 of the secondary structure may be attached to the first cover part 46. The retractor mechanism 20 and the belt 50 may be mounted to the frame assembly 14 in a middle area 114 of the seatback 12. The retractor mechanism 20 and the belt 50 may be selectively positioned in a location on the frame assembly 14 suited for support of an occupant 38 during a vehicle collision (for example, a rear dynamic impact represented by arrow I in FIG. 1).

As such, the belt 50 and the secondary structure 18 may be secured to various seatback 12 components to form an energy absorbing structure for absorbing the energy of an occupant 38 during a vehicle collision. Specifically, with reference to FIG. 1, the belt 50 and the secondary structure 18 may be secured to various seatback 12 components to absorb the energy of an occupant 38 moving in the direction of arrow II due to a vehicle collision (for example, a rear impact shown by arrow I). Additionally, as will be further explained herein, the secondary structure 18 may also support an occupant 38 during standard (i.e., non-collision) driving conditions.

Figure 6:
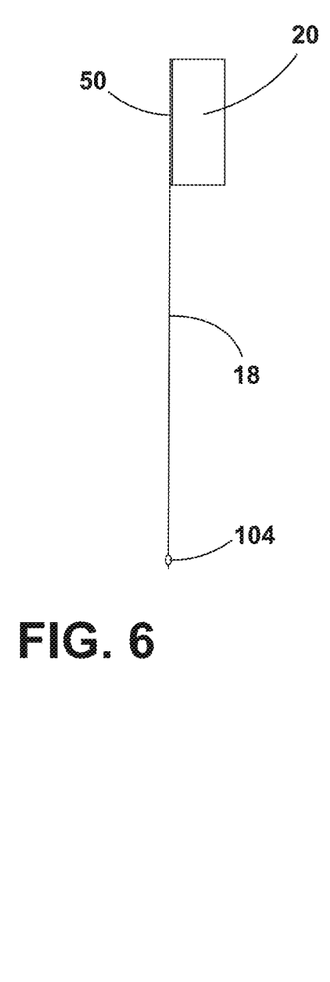
FIG. 6 is a schematic cross-sectional view taken along line VI-VI of FIG. 5 of the secondary structure and belt, according to an embodiment.

Referring to FIG. 6, a cross-sectional schematic view of the secondary structure 18 is shown. The secondary structure 18 includes a fastener 104 for attaching the secondary structure 18 to the second cross member 64.

Figure 7:
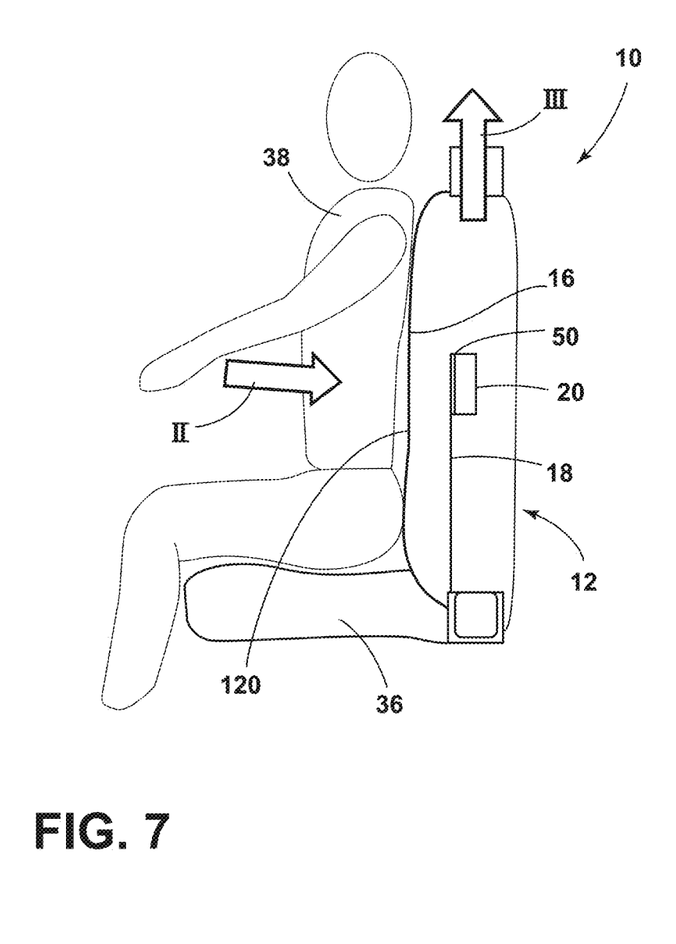
FIG. 7 is a schematic cross-sectional view of a first occupant position during a rearward dynamic event, according to an embodiment.
Figure 8:
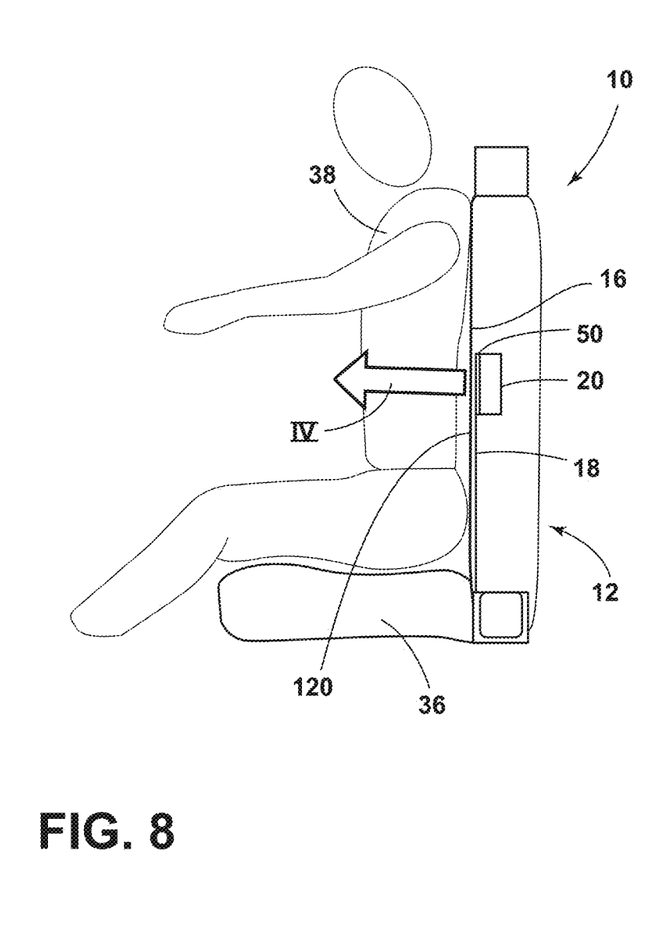
FIG. 8 is a schematic cross-sectional view of a second occupant position during a rearward dynamic event, according to an embodiment.

Referring to FIGS. 7 and 8, schematic views of two stages of a rear dynamic event represented by arrow I in FIG. 1 are shown. Referring to FIG. 7, a first stage of a rearward dynamic event (as represented by arrow I in FIG. 1) is shown. The seating assembly 10 may include a seatback 12 and a seat 36. The arrows II, III show the movement of the occupant 38 in the event of a rear dynamic event (arrow I in FIG. 1). The generally horizontal arrow II shows the direction the occupant 38 may move into the seatback 12. The generally vertical arrow III shows the direction the occupant 38 may move upward along the seatback 12.

With reference to FIGS. 7 and 10-12 and as will be further explained herein, during a rearward dynamic event (as shown by arrow I in FIG. 1), an ignition may cause the retractor mechanism 20 to be placed in the locked position B or the pre-tensioned position C. Accordingly, the fixed belt 50b or the pre-tensioned belt 50c and the secondary structure 18 may create a reaction surface 120 to manage the momentum and force of the occupant 38 during the rearward dynamic event represented by arrow I in FIG. 1.

Referring to FIG. 8, a second stage of a rearward dynamic event, as represented by arrow I in FIG. 1, is shown. The arrow IV shows the reaction force of the belt 50 and the secondary structure 18 against the occupant 38. As the occupant 38 moves into the primary seating structure 16, the belt 50 and the secondary structure 18 may catch the hips of the occupant 38. By catching the hips of the occupant 38, the belt 50 and the secondary structure 18 may absorb and decrease the momentum of the occupant 38 and the force from the rear dynamic event (arrow I in FIG. 1).

With reference to FIGS. 8 and 10-12 and as will be further explained herein, because the retractor mechanism 20 has ignited and has been placed in a locked position B or a pre-tensioned position C, the belt 50 and the secondary structure 18 may prevent the occupant 38 from penetrating into the primary structure 16 any further.

Figure 9:
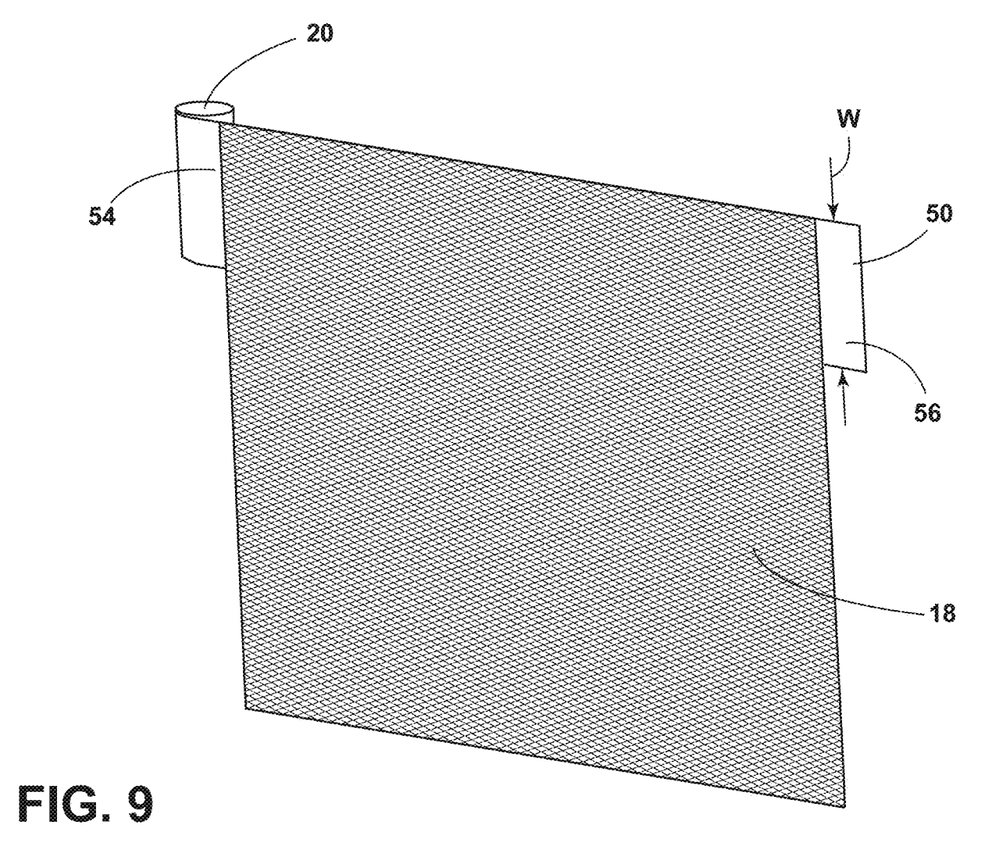
FIG. 9 is a perspective view of a secondary structure, a belt, and a retractor mechanism, according to an embodiment.

With reference now to FIG. 9, a perspective view of the secondary structure 18, the belt 50, and the retractor mechanism 20 is shown. The first end 54 of the belt 50 is shown proximate the retractor mechanism 20. The second end 56 of the belt 50 is also shown. The width of the belt may be designated by W.

Figure 10:
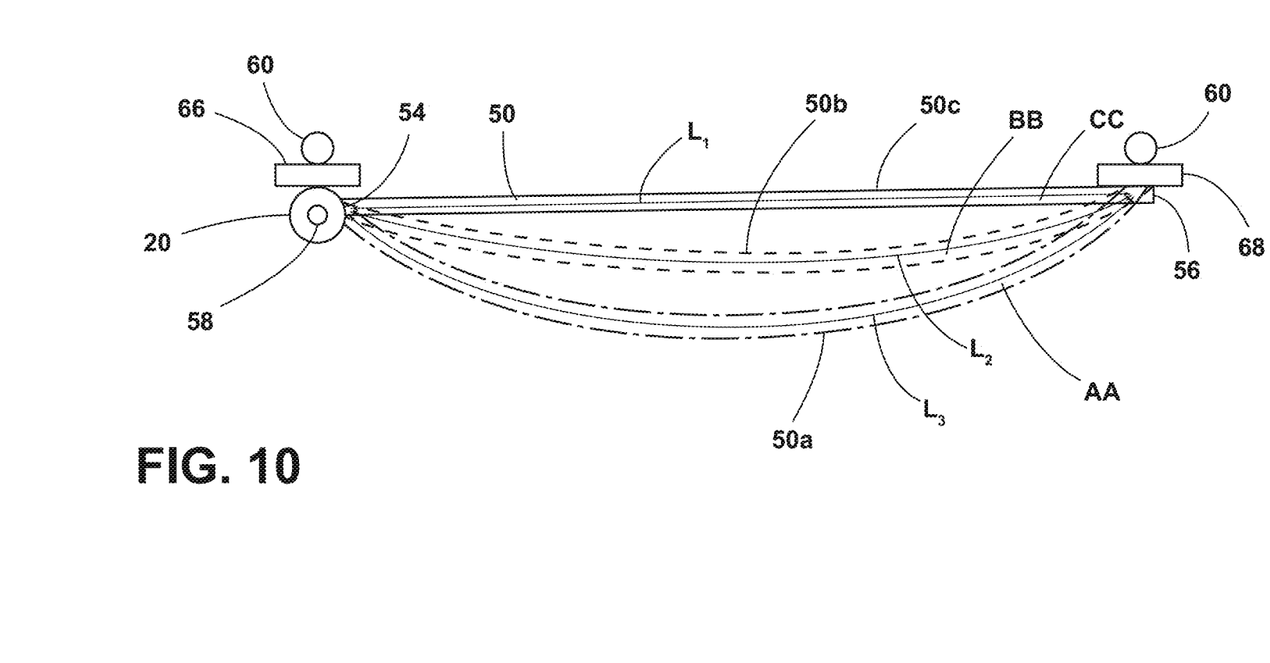
FIG. 10 is a schematic view of the belt in a retracted position, a fixed position, and a spooling position, according to an embodiment.

Referring now to FIG. 10, a schematic view is shown of the belt 50 in various positions during standard (i.e., non-collision) vehicle use and during dynamic vehicle events such as the rear impact depicted by arrow I in FIG. 1. The first end 54 of the belt 50 is shown attached to the retractor mechanism 20. The retractor mechanism 20 may be attached to the first mounting plate 66. The first mounting plate 66 may be attached to the frame 60. A spool 58 may be disposed in the retractor mechanism 20. The second end 56 of the belt 50 is shown fixed to the second mounting plate 68. The second mounting plate 68 may be attached to the frame 60. The belt 50c is shown in a retracted position CC. The exposed belt length $L_1$ may designate the length of the exposed portion of the belt $50c$ when the belt $50c$ is in the retracted position CC. The belt $50b$ is shown in a fixed position BB. The exposed belt length $L_2$ may designate the exposed portion of the belt $50b$ when the belt $50b$ is in the fixed position BB. The belt $50a$ is shown in a spooling position AA. The exposed belt length $L_3$ may designate the length of the exposed portion of the belt $50a$ when the belt $50a$ is in the spooling position AA.

The exposed length $L_1$ may be less than the exposed length $L_2$. The exposed length $L_2$ may be less than the exposed length $L_3$.

Figure 11A:
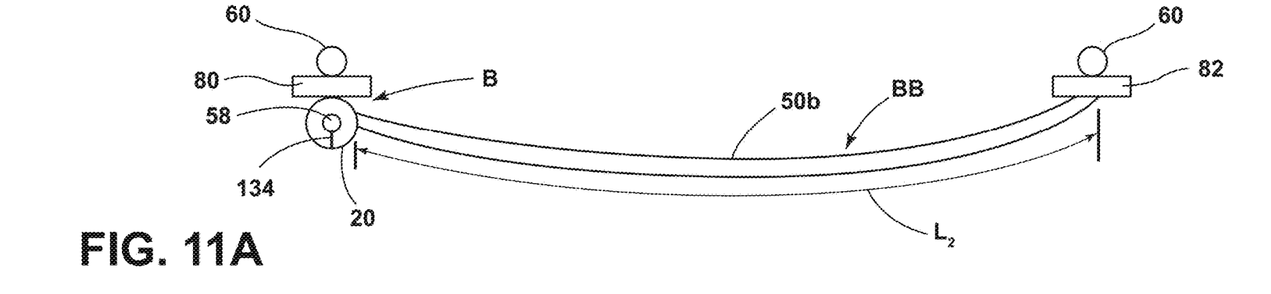
FIG. 11A is a schematic view of the retractor mechanism in a locked position and the belt in a fixed position, according to an embodiment.
Figure 11B:
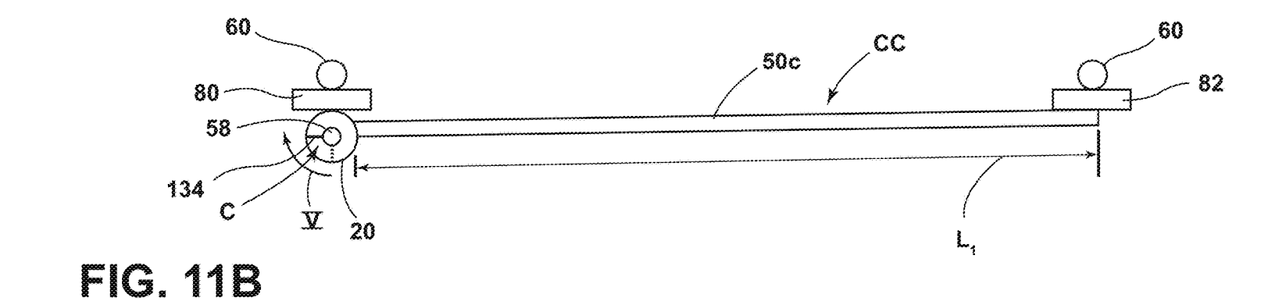
FIG. 11B is a schematic view of the retractor mechanism in a pre-tensioned position and the belt in a retracted position, according to an embodiment.
Figure 11C:
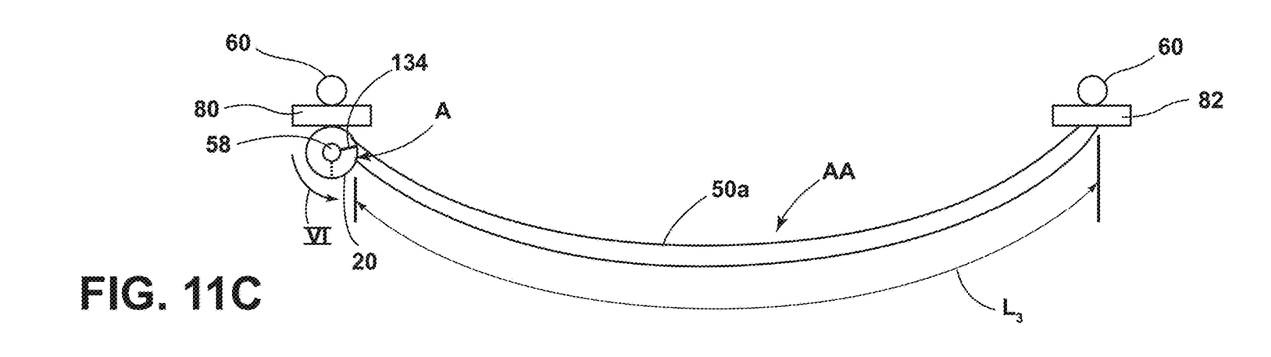
FIG. 11C is a schematic view of a retractor mechanism in an unlocked position and the belt in a spooling position, according to an embodiment.

Referring now to FIGS. 11A-11C, the positions of the retractor mechanism 20 and the corresponding exposed belt lengths are shown. With respect to FIG. 11A, the retractor mechanism 20 is shown in the locked position B with the indexing marker 134 in a locked position B. The belt $50b$ is shown in a fixed position BB and having an exposed length $L_2$.

With respect to FIG. 11B, the retractor mechanism 20 is shown in the pre-tensioned position C with the indexing marker 134 moved to a pre-tensioned position C. The belt $50c$ is shown in the retracted position CC and having an exposed length $L_1$. Arrow V shows movement of the retractor mechanism 20 from the locked position B to the pre-tensioned position C. The belt $50b$ may be wound around the spool 58 in the clockwise direction shown by arrow V from the fixed position BB to the retracted position CC.

Referring to FIG. 11C, the retractor mechanism 20 is shown in the unlocked position A with the indexing marker 134 moved to an unlocked position A. The belt $50a$ is shown in the spooling position AA and having an exposed length $L_3$. Arrow VI shows movement of the retractor mechanism 20 in a counterclockwise direction from the locked position B to the unlocked position A. The belt $50a$ may be released from the spool 58 in a counterclockwise direction shown by arrow VI from the fixed position BB to the spooling position AA.

During standard (i.e., non-collision) driving conditions, the belt 50 may spool in and out of the retractor mechanism 20 in an unlocked position A. The occupant 38 may minimally feel the belt 50 and the secondary structure 18 as the belt 50 spools in and out of the retractor mechanism 20. During dynamic events (for example, a rear dynamic impact shown by arrow I in FIG. 1), the retractor mechanism 20 may lock the belt $50b$ in a fixed position BB so that the belt $50b$ may be substantially restrained from spooling in and out of the retractor mechanism 20. The retractor mechanism 20 may lock the belt $50b$ in the fixed position BB so that the belt $50b$ has a exposed length $L_2$. During dynamic events, the retractor mechanism 20 may pre-tension the belt $50c$ in a retracted position CC so that the belt $50c$ may spool into the retractor mechanism 20 so that a predetermined exposed length $L_1$ of the belt $50c$ is exposed. In various embodiments, during dynamic events (such as a rear dynamic impact shown by arrow I in FIG. 1), the retractor mechanism 20 may move from an unlocked position A to a locked position B and then to a pre-tensioned position C. In various embodiments, during dynamic events (such as a rear dynamic impact shown by arrow I in FIG. 1), the retractor mechanism 20 may move from the unlocked position A directly to the pre-tensioned position C. As such, during dynamic events (such as a rear dynamic impact shown by arrow I in FIG. 1), the retractor mechanism 20 may move from an unlocked position A to a locked position B. In various embodiments, during dynamic events the activation of the retractor mechanism 20 to the locked and/or pre-tensioned positions B, C, in combination with the secondary structure 18, may create a reaction surface 120 to capture and manage the energy of the rearward motion (arrow II in FIG. 7) of the occupant 38.

It is to be understood that the positions of the retractor 20 and the belt 50 may determine the corresponding positions of the secondary structure 18. As previously discussed with reference to FIG. 5, the secondary structure 18 may be secured to the frame assembly 14. Fasteners 104 may secure the fourth edge 112 of the secondary structure 18 to the frame assembly 14. The retractor 20 and the belt 50 may secure the third edge 110 of the secondary structure 18 to the frame assembly 14. First and second edges 106, 108 of the secondary structure 18 may be coupled to seatback 12 components.

Thus, an unlocked position A of the retractor mechanism 20 may correspond to an unlocked position of the secondary structure 18. A locked position B of the retractor mechanism 20 may correspond to a locked position of the secondary structure 18. A pre-tensioned position C of the retractor mechanism 20 may correspond to a retracted position of the secondary structure 18. Similarly, a spooling position AA of the belt 50 may correspond to a spooling position of the secondary structure 18. A fixed position BB of the belt 50 may correspond to a fixed position of the secondary structure 18. A retracted position CC of the belt 50 may correspond to a retracted position of the secondary structure 18.

Figure 12:
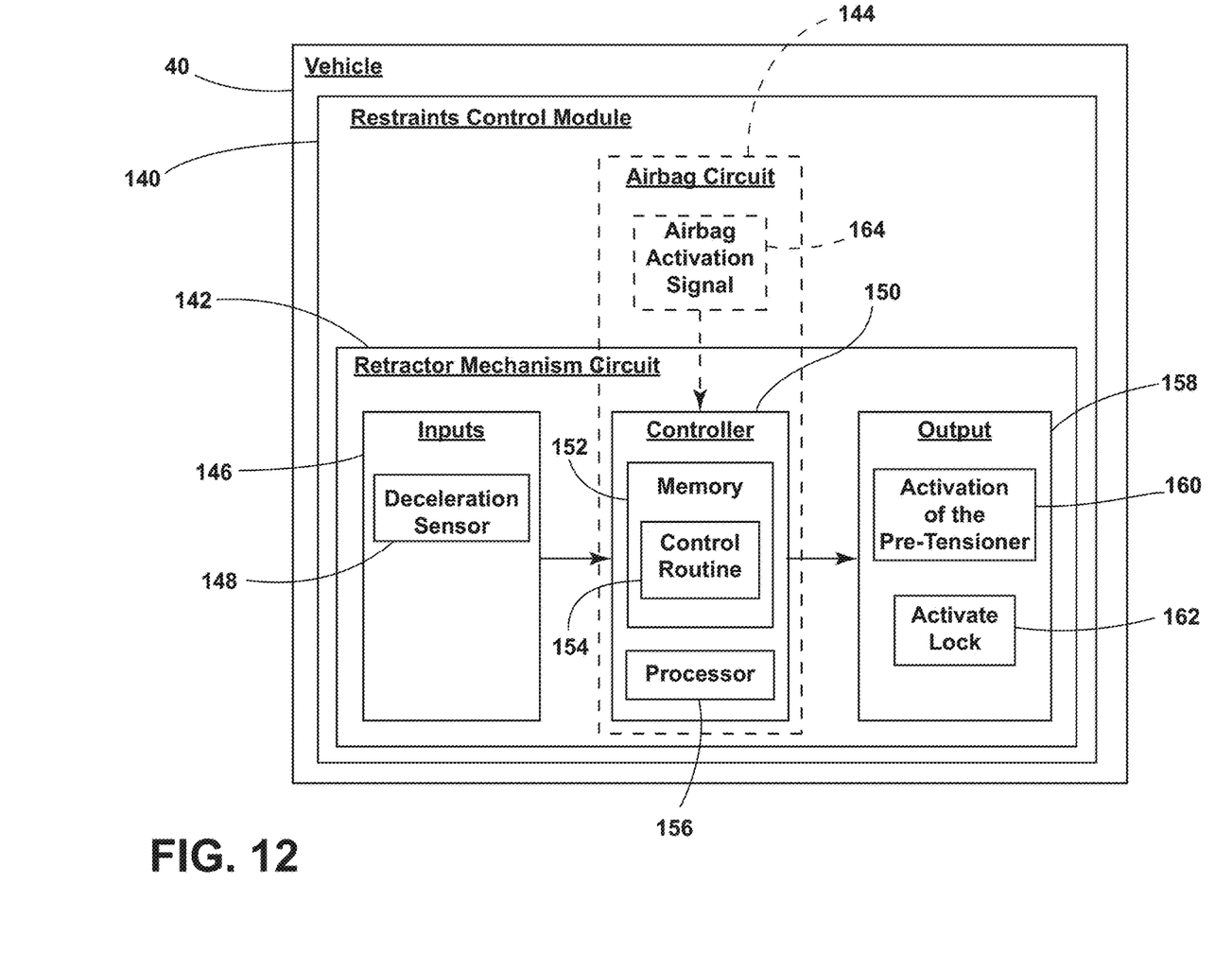
FIG. 12 is a block diagram of a vehicle including a restrains control module, according to an embodiment.

Referring now to FIG. 12, a control diagram of a vehicle 40 is shown. The vehicle 40 may include a restraints control module 140 having a retractor mechanism circuit 142 and an airbag circuit 144. The vehicle 40 may include a retractor mechanism circuit 142 for controlling the retractor mechanism 20. The retractor mechanism circuit 142 may include inputs 146. One input 146 may be a deceleration sensor 148. The inputs 146 may communicate with the controller 150. The controller 150 may include a memory 152 with a control routine 154. The controller 150 may also include a processor 156. The controller 150 may selectively activate the outputs 158. One output 158 may be activation of the pre-tensioner 160. Another output 158 may be activation of the lock 162. In various embodiments, the controller 150 may be part of an airbag circuit 144. The controller 150 may receive an airbag activation signal 164. The airbag activation signal 164 may cause an output 158 that may include activation of the pre-tensioner 160.

By way of example, the vehicle 40 may decelerate very rapidly, and an accelerometer and/or or decelerometer (deceleration sensor 148) may detect the rapid change in speed and send a signal to a restraints control module 140. The restraints control module 140 may determine if the deceleration is great enough to trigger the airbag circuit 144. The airbag circuit 144 may ignite a chemical explosive in the retractor mechanism 20. As the chemical reaction occurs, the chemical reaction may place the retractor mechanism 20 in the locked position B or the pre-tensioned position C to prevent the belt $50b$, $50c$ from spooling out of the retractor mechanism 20. During a rear dynamic event (shown by arrow I in FIG. 1) with a great enough force to trigger the restraints control module 140, the occupant 38 may begin to penetrate into the primary structure 16 of the seatback 12. As the occupant 38 moves rearward (arrow II in FIGS. 1, 7) into the primary structure 16 of the seatback 12, the belt 50 and the secondary structure 18 may catch the hip of the occupant 38 to absorb and decrease the momentum of the occupant 38 and to absorb and decrease the force from the rear dynamic event. Because the retractor mechanism 20 may have been placed in the locked B or pre-tensioned position C from the aforementioned chemical reaction, the belt 50b or 50c and the secondary structure 18 may prevent the occupant 38 from penetrating the primary structure 16 any further.

In various embodiments, the belt 50 may have various widths W (FIG. 9). In various embodiments, the retractor mechanism 20 may be configured to receive belts 50 having various widths W (FIG. 9). In various embodiments, more than one belt 50 may support the secondary structure 18. In various embodiments, the more than one belt 50 that may support the secondary structure 18 may be coupled with one or more retractor mechanisms 20. In various embodiments, the belt 50 may be a portion of the secondary structure 18 and may be attached to the retractor mechanism 20.

In various embodiments, the retractor mechanism 20 may include a mechanical pre-tensioner or locking mechanism or an electronic/pyrotechnic pre-tensioner or locking mechanism.

In various embodiments, the vehicle seating assemblies 10 may be positioned in various positions in a vehicle 40. For example, the seating assemblies may be positioned in a rearward facing orientation in an autonomous vehicle. When the seating assemblies may be positioned in a rearward facing orientation in an autonomous vehicle, then the seatback may absorb and dissipate the energy from a vehicle collision that may be a forward dynamic event.

A variety of advantages may be derived from use of the present disclosure. A seatback may include a primary structure with a see-through seatback seating surface and a secondary structure with a see-through surface designed to support the primary structure during a vehicle collision. The primary structure, the secondary structure, the belt, and the retractor mechanism may provide predictable energy management of the occupant during the collision. The retractor mechanism, the belt, and the secondary structure may dissipate the occupant energy during a dynamic event such as a rear collision and thus help to prevent occupant injuries such as whiplash, upper neck strain, neck extension, and other neck related injuries. The secondary structure may support the primary structure during a vehicle collision so that the primary structure does not undergo material yield.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
    a seatback including:
        a frame assembly having first and second portions;
        a primary structure extending between the first and second portions and defining a seating surface;
        a secondary structure extending between the first and second portions; and
        a retractor mechanism disposed on one of the first and second portions and selectively positionable in an unlocked, a locked, or a pre-tensioned position, wherein the secondary structure includes a belt including a first end coupled to one of the first and second portions and a second end coupled to the retractor mechanism disposed on a respective opposing first or second portion, wherein the first portion includes a first longitudinal portion, wherein the second portion includes a second longitudinal portion, wherein the secondary structure includes a mat having a first edge aligned with the first longitudinal portion and a second edge aligned with the second longitudinal portion, wherein the mat includes a third edge, and wherein the belt is attached to the third edge of the mat.

2. The vehicle seating assembly of claim 1, wherein when the retractor mechanism is in an unlocked position, the belt is in a spooling position.

3. The vehicle seating assembly of claim 2, wherein when the retractor mechanism is in a locked position, the belt is in a fixed position.

4. The vehicle seating assembly of claim 3, wherein when the retractor mechanism is in a pre-tensioned position, the belt is in a retracted position.

5. The vehicle seating assembly of claim 4, wherein when the belt is in a retracted position, the belt includes a predetermined exposed length.

6. The vehicle seating assembly of claim 1, wherein the secondary structure includes a mesh mat.

7. The vehicle seating assembly of claim 1, further comprising a cover assembly disposed around the frame.

8. The vehicle seating assembly of claim 7, wherein the cover assembly comprises a first cover part and a second cover part.

9. A vehicle seating assembly comprising:
    a seatback including:
        a primary structure;
        a secondary structure;
        a frame assembly; and
        a selectively positionable retractor mechanism coupled to the frame assembly and the secondary structure; and
    a controller in communication with the selectively positionable retractor mechanism and configured to receive an input and to activate a pre-tensioner disposed in the retractor mechanism to retract the secondary structure in response to the input, wherein the controller is disposed in an airbag circuit and wherein the controller selectively activates the pre-tensioner in response to an airbag activation signal.

10. The vehicle seating assembly of claim 9, wherein the controller selectively activates the pre-tensioner in response to a deceleration signal.

11. A vehicle seating assembly comprising:
    a seatback including:
        a frame assembly including first and second portions;
        a primary structure defining a seating surface coupled to the frame assembly;
        a secondary structure coupled to the frame assembly;
        a belt extending between the first and second portions and coupled to the secondary structure; and
        a retractor mechanism disposed on one of the first and second portions of the frame assembly and receiving an end of the belt, wherein the retractor mechanism is selectively activated to adjust a position of the belt and the secondary structure, wherein during standard driving conditions, if the retractor mechanism is in an unlocked position, the belt is in a spooling position.

12. The vehicle seating assembly of claim 11, wherein the belt is selectively positionable in at least one of a spooling position, a fixed position, and a retracted position.

13. The vehicle seating assembly of claim 11, wherein the primary structure comprises a see-through material.

14. The vehicle seating assembly of claim 13, wherein the secondary structure comprises a see-through material.

15. The vehicle seating assembly of claim 11, wherein the secondary structure is fastened to a cross member of the frame assembly.

\* \* \* \* \*